US012674755B2

(12) United States Patent (10) Patent No.: US 12,674,755 B2

Furuya et al. (45) Date of Patent: Jul. 7, 2026

(54) OPTICAL DENSITY MEASURING APPARATUS

(71) Applicant: Asahi Kasei Microdevices Corporation, Tokyo (JP)

(72) Inventors: Takaaki Furuya, Tokyo (JP); Ryotaro Okuda, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 100 days.

(21) Appl. No.: 18/932,621

(22) Filed: Oct. 31, 2024

(65) Prior Publication Data

US 2025/0146935 A1 May 8, 2025

(30) Foreign Application Priority Data

Nov. 2, 2023 (JP) ................................. 2023-188847
Sep. 12, 2024 (JP) ................................. 2024-158643

(51) Int. Cl.
*G01N 21/61* (2006.01)
*G01N 21/03* (2006.01)

(52) U.S. Cl.
CPC ............. *G01N 21/61* (2013.01); *G01N 21/03* (2013.01); *G01N 2021/0378* (2013.01)

(58) Field of Classification Search
CPC ................... G01N 21/61; G01N 21/03; G01N 2021/0378; G01N 21/031; G01N 21/3504; G01N 2201/0221
USPC ......................................................... 356/437
See application file for complete search history.

(56) References Cited

U.S. PATENT DOCUMENTS

2014/0326889 A1 11/2014 Sakamoto
2019/0195778 A1 6/2019 Lee et al.

FOREIGN PATENT DOCUMENTS

JP 2013002966 A 1/2013
JP 2013092375 A 5/2013
JP 2022071816 A 5/2022

*Primary Examiner* — Md M Rahman
(74) *Attorney, Agent, or Firm* — KENJA IP LAW PC

(57) ABSTRACT

A compact and highly accurate optical density measuring apparatus that includes an ellipsoidal mirror and a folding mirror is provided. In the optical density measuring apparatus, the shape of at least a part of the inner surface of a light guiding part is composed of a figure of a part of an ellipsoid E, and a shape of at least a part of another portion of the inner surface of the light guiding part is composed of a figure of a part of a plane or a quadric surface. 60% or more of the area of a light source region of a light emitting part is present in a region $R_{in}$, and 60% or more of the area of a light receiving region of a light receiving part is present in a region $R_{out}$.

20 Claims, 9 Drawing Sheets

*FIG. 7B*

OPTICAL DENSITY MEASURING APPARATUS

CROSS-REFERENCE TO RELATED APPLICATION

The present application claims priority to Japanese Patent Application No. 2023-188847 filed on Nov. 2, 2023, and Japanese Patent Application No. 2024-158643 filed on Sep. 12, 2024, the entire contents of which are incorporated herein by reference.

TECHNICAL FIELD

The present disclosure relates to an optical density measuring apparatus.

BACKGROUND

Gas detection apparatuses for detecting gases have been used in various fields. For example, Patent Literature (PTL) 1 discloses an apparatus including a light source for emitting infrared light and a detector for detecting infrared light at a specific wavelength, accommodated in a case having an ellipsoidal inner surface (ellipsoidal mirror), wherein a gas to be detected is introduced inside the case.

CITATION LIST

Patent Literature

PTL 1: JP 2022-071816 A

SUMMARY

PTL 1 discloses an optical path design in which a light emitting part and a light receiving part are disposed in regions on the outside of the focal positions of an ellipsoidal mirror. When the ellipsoidal mirror is not large compared to the size of the light emitting part, the light rays emitted from the light emitting part can be collected at the light receiving part placed at the other outside region of the ellipse.

With the miniaturization trend of gas detection apparatuses in recent years, demand exists for a further decrease in size.

Therefore, demand exists for using the space volume even more efficiently to increase the optical path length per size, thereby increasing gas sensitivity per volume.

It would be helpful to provide a compact and highly accurate optical density measuring apparatus that includes an ellipsoidal mirror and a folded mirror.

(1) An optical density measuring apparatus including: a light emitting part; a light receiving part; and a light guiding part for guiding light from the light emitting part to the light receiving part, wherein a shape of at least a part of an inner surface of the light guiding part is composed of a figure of a part of an ellipsoid E, and a shape of at least a part of another portion of the inner surface of the light guiding part is composed of a figure of a part of a plane or a quadric surface, and when:

an ellipse having a maximum area in a cross-section of the ellipsoid E is defined as an ellipse $E_c$, and an ellipsoid that passes through two focal points $F_a$ and $F_b$ of the ellipse $E_c$ and has a minimum volume having a scaling relationship with the ellipsoid E without being rotated is defined as an ellipsoid $E_{in}$;

a region included in the ellipsoid $E_{in}$ is defined as a region $R_{in}$; and a region inside the ellipsoid E and not included in the ellipsoid $E_{in}$ is defined as a region $R_{out}$;

60% or more of an area of a light source region of the light emitting part is present in the region $R_{in}$, and 60% or more of an area of a light receiving region of the light receiving part is present in the region $R_{out}$.

(2) In an embodiment of the present disclosure, in (1), all of the area of the light source region of the light emitting part is present in the region $R_{in}$, and all of the area of the light receiving region of the light receiving part is present in the region $R_{out}$.

(3) In an embodiment of the present disclosure, in (1), the plane or the quadric surface passes through a vicinity of one focal point of the ellipse $E_c$.

(4) In an embodiment of the present disclosure, in (1), the light receiving part is located near an edge of the ellipsoid E.

(5) In an embodiment of the present disclosure, in (1) or (2), an angle between an elliptical symmetry plane present at a center of a major axis of the ellipsoid E and a portion where the light guiding part is connected to the plane or the quadric surface is 1° or more.

(6) In an embodiment of the present disclosure, in any one of (1) to (5), a ratio a/b of a long radius a to a short radius b of the ellipse $E_c$ is 1.2 or more.

(7) In an embodiment of the present disclosure, in any one of (1) to (6), the vicinity is a region at a distance of $L_E/4$ or less from the one focal point when $L_E$ is a maximum length of the ellipsoid E.

(8) In an embodiment of the present disclosure, in any one of (1) to (7), $L_s \geq (L_E/50)$ when $L_s$ is a maximum length of the light source region and $L_E$ is a maximum length of the ellipsoid E.

(9) In an embodiment of the present disclosure, in any one of (1) to (8), $L_d \geq (L_E/50)$ when $L_d$ is a maximum length of the light receiving region and $L_E$ is a maximum length of the ellipsoid E.

(10) In an embodiment of the present disclosure, in any one of (1) to (9), an identical holding part holds the light emitting part and the light receiving part.

(11) In an embodiment of the present disclosure, any one of (1) to (10) further includes an auxiliary reflector composed of a figure different from the ellipsoid E.

(12) In an embodiment of the present disclosure, in (11), the auxiliary reflector is present in the region $R_{in}$.

(13) In an embodiment of the present disclosure, in any one of (1) to (12), the light emitting part is a plane light source.

(14) In an embodiment of the present disclosure, in any one of (1) to (13), the ellipsoid E is a spheroid.

(15) In an embodiment of the present disclosure, in any one of (1) to (14), the shape of at least the part of another portion of the inner surface of the light guiding part is a plane.

(16) In an embodiment of the present disclosure, in any one of (1) to (14), the shape of at least the part of another portion of the inner surface of the light guiding part is a sphere.

(17) In an embodiment of the present disclosure, in (1), two or more reflection surfaces composed of a figure of a part of a plane or a quadric surface are connected to a symmetry plane of the ellipsoid E.

(18) In an embodiment of the present disclosure, in (17), an angle formed by a part at which the two reflection surfaces are connected is 10° or more and is 90° or less.

(19) An optical density measuring apparatus including: a light emitting part; a light receiving part; and a light guiding part for guiding light from the light emitting part to the light receiving part, wherein a shape of at least a part of an inner surface of the light guiding part is composed of a figure of a part of an ellipsoid E, and a shape of at least a part of another portion of the inner surface of the light guiding part is composed of a figure of a part of a plane or a quadric surface, and when:

an ellipse having a maximum area in a cross-section of the ellipsoid E is defined as an ellipse $E_c$, and an ellipsoid that passes through two focal points $F_a$ and $F_b$ of the ellipse $E_c$ and has a minimum volume having a scaling relationship with the ellipsoid E without being rotated is defined as an ellipsoid $E_{in}$;

a region included in the ellipsoid $E_{in}$ is defined as a region $R_{in}$, and a region inside the ellipsoid E and not included in the ellipsoid $E_{in}$ is defined as a region $R_{out}$;

the center of gravity of the light source region or a peak point of luminance is defined as a point $G_{in}$, the center of gravity of the light receiving region is defined as a point $G_{out}$, the point $G_{in}$ is present in the region $R_{in}$, and the point $G_{out}$ is present in the region $R_{out}$.

(20) An optical density measuring apparatus including: a light emitting part; a light receiving part; and a light guiding part for guiding light from the light emitting part to the light receiving part, wherein a shape of at least a part of an inner surface of the light guiding part is composed of a figure of a part of an ellipsoid E, and a shape of at least a part of another portion of the inner surface of the light guiding part is composed of a figure of a part of a plane or a quadric surface, and when:

an ellipse having a maximum area in a cross-section of the ellipsoid E is defined as an ellipse $E_c$, and an ellipsoid that passes through two focal points $F_a$ and $F_b$ of the ellipse $E_c$ and has a minimum volume having a scaling relationship with the ellipsoid E without being rotated is defined as an ellipsoid $E_{in}$;

a region included in the ellipsoid $E_{in}$ is defined as a region $R_{in}$;

a region inside the ellipsoid E and not included in the ellipsoid $E_{in}$ is defined as a region $R_{out}$;

60% or more of an area of a light source region of the light emitting part is present in the region $R_{out}$, and 60% or more of an area of a light receiving region of the light receiving part is present in the region $R_{in}$.

(21) An optical density measuring apparatus including: a light emitting part; a light receiving part; and a light guiding part for guiding light from the light emitting part to the light receiving part, wherein a shape of at least a part of an inner surface of the light guiding part is composed of a figure of a part of an ellipsoid E, and a shape of at least a part of another portion of the inner surface of the light guiding part is composed of a figure of a part of a plane or a quadric surface, and when:

an ellipse having a maximum area in a cross-section of the ellipsoid E is defined as an ellipse $E_c$, and an ellipsoid that passes through two focal points $F_a$ and $F_b$ of the ellipse $E_c$ and has a minimum volume having a scaling relationship with the ellipsoid E without being rotated is defined as an ellipsoid $E_{in}$;

a region included in the ellipsoid $E_{in}$ is defined as a region $R_{in}$;

a region inside the ellipsoid E and not included in the ellipsoid $E_{in}$ is defined as a region $R_{out}$; and the center of gravity of the light source region or a peak point of luminance is defined as a point $G_{out}$, the center of gravity of the light receiving region is defined as a point $G_{in}$, the point $G_{in}$ is present in the region $R_{in}$, and the point $G_{out}$ is present in the region $R_{out}$.

According to embodiments of the present disclosure, a compact and highly accurate optical density measuring apparatus that includes an ellipsoidal mirror and a folded mirror can be provided.

BRIEF DESCRIPTION OF THE DRAWINGS

In the accompanying drawings:

FIG. 7B is a front view illustrating an example configuration of a gas detection apparatus including a long axis symmetry plane mirror.

DETAILED DESCRIPTION

Gas Detection Apparatus

Figure 1:
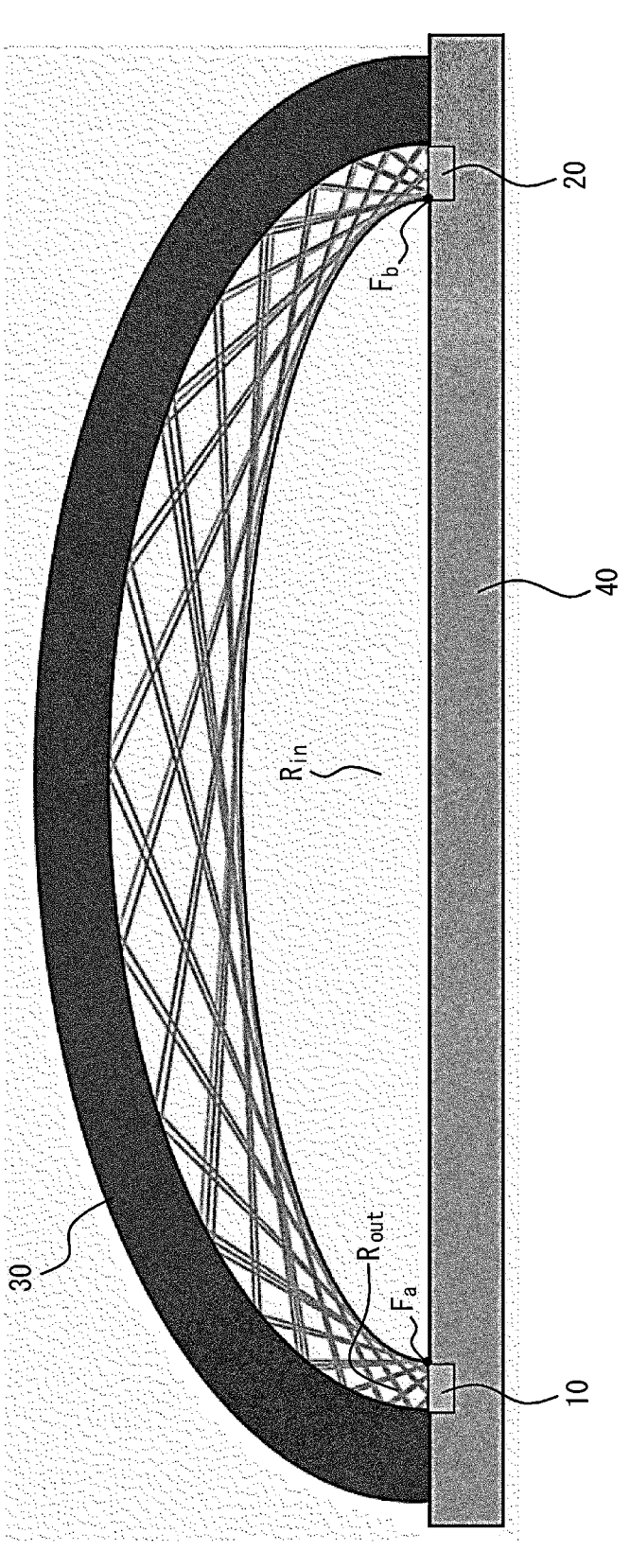
FIG. 1 is a diagram illustrating an example of ray tracing in a conventional ellipsoidal mirror.
Figure 2:
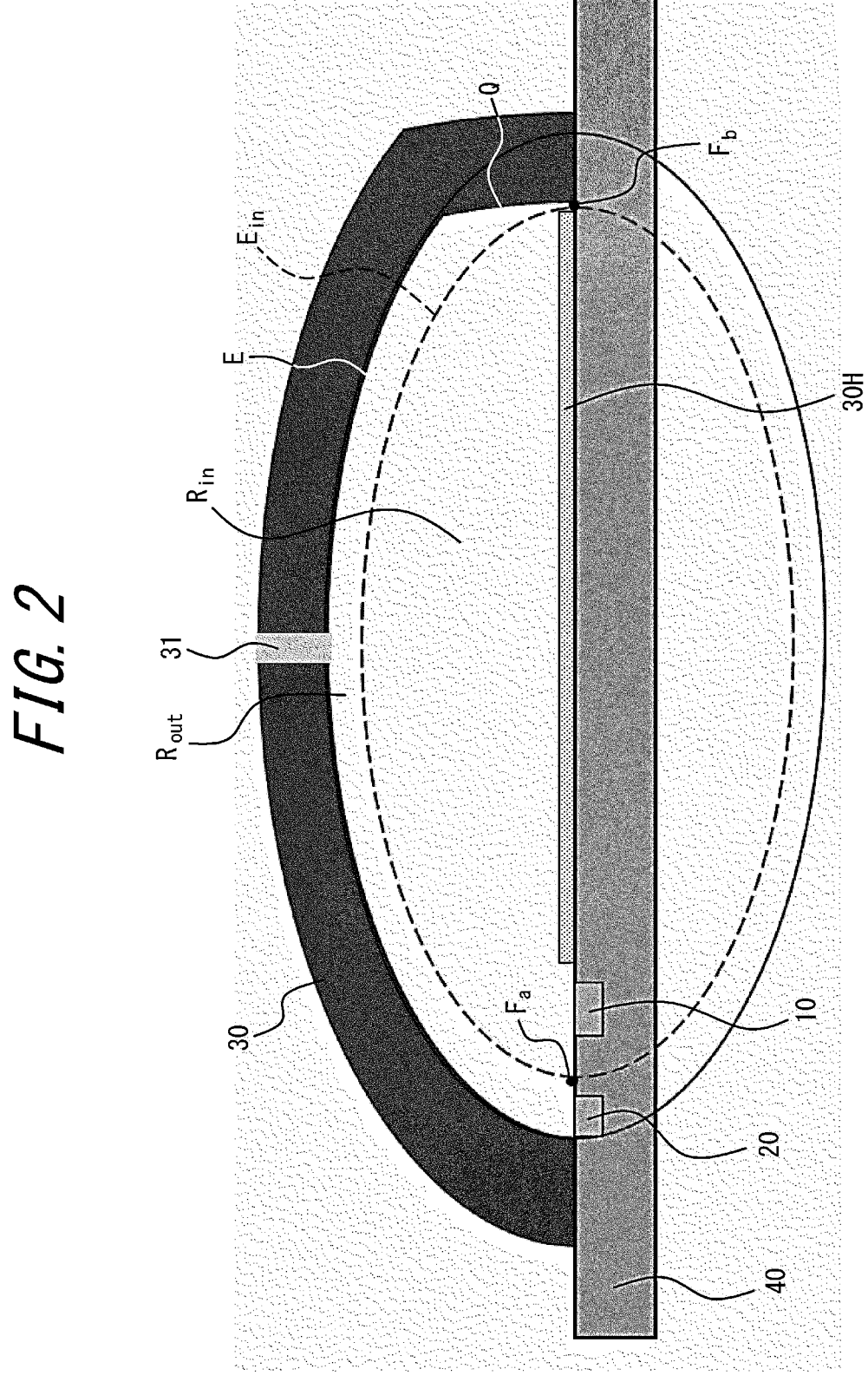
FIG. 2 is a diagram illustrating an example configuration of a gas detection apparatus according to an embodiment of the present disclosure.

FIG. 1 is a diagram illustrating an example of ray tracing in a conventional ellipsoidal mirror. FIG. 2 is a cross-sectional view of a gas detection apparatus according to an embodiment of the present disclosure. As an example, the gas detection apparatus is a compact apparatus with length, width and height of 7.8 mm, 9.0 mm, and 4.7 mm, respectively, and is also referred to as a gas sensor.

In the present embodiment, the gas detection apparatus is a Non Dispersive InfraRed (NDIR) type apparatus that measures the concentration of a gas to be detected based on the infrared rays transmitted through an introduced gas. The gas detection apparatus in the present embodiment can be applied to various devices. For example, the gas detection apparatus can be applied to environmental measurement in buildings, mounted on mobile communication devices such as smartphones as a portable compact measurement device, or used to detect the gas concentration in the interior of modes of transportation such as cars, trains, or airplanes.

The gas to be detected is carbon dioxide ($CO_2$) in the present embodiment but is not limited to $CO_2$. Other examples include combustible gases such as alcohol (ethanol or the like), methane, propane, hydrogen, ethylene, and MCH (methyl cyclohexane). The gas to be detected may also be a toxic gas such as carbon monoxide, hydrogen sulfide, formaldehyde, or ammonia. Furthermore, the gas to be detected may be a greenhouse gas, such as dinitrogen monoxide, refrigerant gases used in air conditioners or refrigerators, or the like.

Furthermore, according to the configuration of the gas detection apparatus in the present embodiment, the gas detection apparatus can be applied to a light receiving and emitting apparatus for applications other than gas detection. In other words, the matter derived by replacing the above-described "gas detection apparatus" with "optical density measurement apparatus", "optical physical quantity measurement apparatus", "light receiving and emitting apparatus", "optical apparatus", and the like is included in the scope of the present disclosure. For example, it is possible to detect the state of the optical path space (as an example other than gas, the presence/absence or concentration of a specific component of a fluid). For example, the gas detection apparatus can be used in a component detection apparatus, a component concentration measuring apparatus, or the like for a substance (for example, water or body fluid) present in the optical path space between the light emitting part and light receiving part. For example, the component detection apparatus or component concentration measuring apparatus can be used to measure the glucose concentration in blood in a case in which the substance present in the optical path space is blood.

The component detection apparatus or component concentration measuring apparatus can measure the glucose concentration in blood sugar by measuring the absorption of light at wavelengths from 1 μm to 10 μm. In measuring glucose concentration in blood sugar, the absorption of light at 1.6 μm, 2.0 μm to 2.3 μm, and 9.6 μm is preferably measured. A compact, highly accurate and highly reliable non-invasive glucose concentration measuring instrument can be realized. Such a glucose concentration measuring instrument allows, for example, diabetic patients to examine blood sugar levels by themselves with high accuracy and without causing damage to the skin, as would occur with an invasive method. This also achieves more accurate management of medication (such as insulin) based on the examined blood sugar levels.

The gas detection apparatus of the present embodiment includes a light emitting part 10, a light receiving part 20, and a light guiding part 30 for guiding light from the light emitting part to the light receiving part. The gas detection apparatus may further include a controller that controls the light emitting part 10 and the light receiving part 20 or converts signals, a housing that has a gas port 31 and holds the light guiding part 30, and a holding part 40 that is a substrate or the like for holding the light emitting part 10, the light receiving part 20, the controller, and the housing.

The shape of at least a part of the inner surface of the light guiding part 30 is composed of a figure that is all or a part of an ellipsoid. The shape of at least a part of another portion of the inner surface of the light guiding part 30 is composed of a figure that is part of a plane or a quadric surface.

The ellipsoid constituting the shape of at least a part of the inner surface of the light guiding part 30 may be denoted as an ellipsoid E. The ellipsoid E may be a rotating ellipsoid. FIG. 2 is a diagram illustrating details of the configuration of the gas detection apparatus. The light guiding part 30 includes a portion corresponding to the ellipsoid E (elliptical mirror 30E) and another portion (folded mirror 30C, see FIG. 4). The light guiding part 30 may include yet another portion that is planar (long axis symmetry plane mirror 30H). An ellipse having a maximum area in a cross-section of the ellipsoid E is defined as an ellipse $E_c$, and an ellipsoid that passes through two focal points $F_a$ and $F_b$ of the ellipse $E_c$ and has a minimum volume having a scaling relationship with the ellipsoid E without being rotated is defined as an ellipsoid $E_{in}$. A region included in the ellipsoid $E_{in}$ is defined as a region $R_{in}$. A region inside the ellipsoid E and not included in the ellipsoid $E_{in}$ is defined as a region $R_{out}$. The shape of at least a part of another portion (folded mirror 30C) of the inner surface of the light guiding part 30 is composed of a figure that is part of a plane or quadric surface. In the present embodiment, it is assumed that a reflection surface Q of the folded mirror 30C is composed of a figure of a part of a plane or quadric surface. Although the gas detection apparatus in the example in FIG. 2 has a shape to include only a portion of the ellipsoid E, when describing the ellipsoid or ellipse, the existence of a virtual ellipsoid or ellipse composed of a virtual extension of the surface is assumed.

The gas detection apparatus according to the present embodiment is configured so that 60% or more of the area of the light source region of the light emitting part 10 is present in the region $R_{in}$, and 60% or more of the area of the light receiving region of the light receiving part 20 is present in the region $R_{out}$.

The aforementioned reflection surface Q is also configured to pass through the vicinity of one of the focal points of the ellipse $E_c$.

Although the detailed principle will be described later, with this configuration, a compact and highly accurate gas detection apparatus using an ellipsoidal mirror can be provided.

Interrelationship of Components

As described above, the gas detection apparatus includes the light emitting part 10, the light receiving part 20, and the light guiding part 30. The gas detection apparatus may further include the holding part 40. Further, the gas detection apparatus may include an additional controller.

The surfaces of the light emitting part 10 and the light receiving part 20 are facing to the space (detection space) between the inner wall of the light guiding part 30 and the upper surface of the holding part 40. Further, the light guiding part 30 may include a gas port 31 that can introduce and withdraw gas into and from the detection space. The holding part 40 may include the gas port 31.

The light emitted from the light emitting part 10 is reflected at least once on the inner surface of the light guiding part 30 and reaches the light receiving part 20.

Light Emitting Part

The light emitting part 10 is a component that emits light used for detection of the gas to be detected. The light emitting part 10 is not particularly limited as long as it outputs light that includes a wavelength absorbed by the gas to be detected. In the present embodiment, the light emitted by the light emitting part 10 is infrared rays, but it is not limited thereto.

The light emitting part 10 has a light emitting element. Although the light emitting element is a light emitting diode (LED) in the present embodiment, other examples include a lamp, a laser (Light Amplification by Stimulated Emission of Radiation), an organic light emitting element or Micro Electro Mechanical Systems (MEMS) heater, and the like. Further, the light emitting part 10 may include not only the light emitting element but also a passive element that passively emits light by receiving the light emitted by the light emitting element. The passive element is, for example, a mirror, an optical filter, a phosphor, an optical image, an optical fiber, an optical waveguide, a lens, or a diffraction grating.

The light emitting part 10 has a light source region. The light source region is a component that generates photons of the light emitting element when the light is guided from the light emitting element to the light guiding part 30 without passing through the passive element as in the present embodiment. For example, the light source region may be the region of the element itself if the light emitting part 10 is a quantum type light emitting element, and it may be the active region. For example, the light source region may be the region of the heat source element itself if the light emitting part 10 is a thermal light source, and it may be the high temperature region. For example, the light source region may be the internal region of the bulb (glass sphere) if the light emitting part 10 is a lamp, and it may be the filament.

Further, when the light emitting part 10 includes a passive element and the light emitted by the light emitting element is guided to the light guiding part 30 through the passive element, the light source region is an aggregate of the light emitting ends of the passive element. For example, when the passive element is a mirror, the light source region is a region that reflects light rays.

Further, when the passive element is an optical filter having a wavelength selection function, for example, the region through which the light rays pass on the surface where the optical filter is in contact with the space may be considered the light source region. Further, when the passive element is an optical fiber, an optical waveguide, or a lens, for example, the emission surface through which the light rays pass on the surface in contact with the space may be considered the light source region.

Further, when an optical image is formed as the light emitting part 10 by a lens, a mirror, or the like, the formed image may be considered a light source region.

Here, the light emitting part 10 is preferably a planar surface light source such as an LED, a MEMS heater, or a Vertical Cavity Surface Emitting Laser (VCSEL). Since the light emitting surface is planar, the volume of the optical image of the light source is small and concentrated, and light can be efficiently collected at the light receiving part 20. This enables configuration of a compact optical system.

Light Receiving Part

The light receiving part 20 is a component that receives light transmitted through the introduced gas. The light receiving part 20 is not particularly limited as long as it has sensitivity in the bandwidth of light including the wavelength absorbed by the gas to be detected. In the present embodiment, the light received by the light receiving part 20 is infrared rays, but the light is not limited to this.

The light receiving part 20 has a light receiving element. In the present embodiment, the light receiving element is a photodiode, but the other examples may include a phototransistor, a thermopile, a pyroelectric sensor, a bolometer, a photoacoustic detector, or the like. Further, the light receiving part 20 may include not only the light receiving element but also an indirect element that guides light to the light receiving element. Indirect elements are, for example, mirrors, optical filters, phosphors, lenses, diffraction gratings, optical fibers, and optical waveguides. Here, at least one of the light receiving part 20 and the light emitting part 10 may be configured to include an optical filter.

The light receiving part 20 has a light receiving region. The light receiving region is a region in the light receiving element having a function of converting the received light into a signal when the light receiving element directly receives light without the light passing through an indirect element, as in the present embodiment. For example, the photosensitive area is the active layer if the light receiving element is a photodiode and is the thermoelectric converter if the light receiving element is a thermopile.

Further, in the light receiving part 20, when the light receiving element receives light through the indirect element, the light receiving region is a region, in the indirect element, that has an optical function for guiding the received light to the light receiving element, and through which light rays pass. When the indirect element is an optical filter having a wavelength selection function, for example, the region through which the light rays pass on the surface where the optical filter is in contact with the space may be considered the light receiving region. Further, when the indirect element is an optical fiber, an optical waveguide, or a lens, the incident surface through which the light rays pass on the surface in contact with the space may be considered the light receiving region. When the indirect element is a mirror, the region that reflects light rays may be considered the light receiving region.

Light Guiding Part

The light guiding part 30 is a member that guides the light emitted by the light emitting part 10 to the light receiving part 20, and is an optical system of the gas detection apparatus. The light emitted from the light emitting part 10 is reflected by the light guiding part 30 and reaches the light receiving part 20. In other words, the light guiding part 30 optically connects the light emitting part 10 and the light receiving part 20.

In the present embodiment, the inner surface of the light guiding part 30 is a mirror (reflection surface). The shape of at least a part of the inner surface has the elliptical mirror 30E, which is a figure of all or a part of an ellipsoid. The light guiding part 30 may further include a flat mirror, a concave mirror or a convex mirror, a lens, or a diffraction grating as an auxiliary component. The auxiliary flat mirror, concave mirror, or convex mirror is referred to as an auxiliary reflector. The gas detection apparatus may further include an auxiliary reflector composed of a figure different from the ellipsoid E, for example, or the auxiliary reflector may be configured to be present within the region $R_{in}$.

In the present embodiment, the shape of the reflection surface Q of the folded mirror 30C, which is at least a part of the inner surface of the light guiding part 30, is composed of a figure that is part of a plane or quadric surface. The folded mirror 30C is arranged so as to pass near a focal point of the aforementioned ellipse $E_c$. In the present embodiment, the light guiding part 30 further has the long axis symmetry plane mirror 30H, which is a flat mirror that is a part of the shape of a symmetry plane including the long axis present in the ellipse E.

The material constituting the mirror may be metal, glass, ceramics, stainless steel, or the like, but is not limited to these examples.

The mirror may also partially function as a wavelength filter.

From the viewpoint of improving the detection sensitivity, these mirrors are preferably made of materials having a low light absorption coefficient and a high reflectance. Specifically, resin housings provided with coating of an aluminum, gold, or silver alloy, a dielectric, or a laminate of these materials are preferred. Examples of the materials of the resin housing include liquid crystal polymer (LCP), polypropylene (PP), polyether ether ketone (PEEK), polyamide (PA), polyphenylene ether (PPE), polycarbonate (PC), polyphenylene sulfide (PPS), polymethyl methacrylate resin (PMMA), polyarylate resin (PAR), or the like, and hard resins of a mixture of two or more of these. Further, resin housings coated with gold or an alloy layer containing gold are preferred in view of the reliability and degradation over time. Moreover, a laminated film of a dielectric is preferably formed on the surface of the metal layer for increasing the reflectance. Formation of the inner surface of the light guiding part 30 on the resin housing by vapor deposition or plating can achieve a higher productivity and provide improved weight reduction as compared with cases where they are made from a metal material. Furthermore, the difference in the thermal expansion coefficients with the holding part 40 is reduced, which suppresses thermal deformations and results in less fluctuation of sensitivity.

Further, the light guiding part 30 may be formed by cutting machining, and is preferably formed by injection molding in view of the productivity. In a case in which the light guiding part 30 is formed by injection molding, if the light guiding part 30 has a concave shape, the injection mold cannot be extracted in one direction. Therefore, from the perspective of productivity, the light guiding part 30 is preferably a convex figure. The folded mirror 30C may be arranged so that it is parallel to a plane of symmetry present at the center along the major axis of the ellipsoid of the elliptical mirror 30E. When the light guiding part 30 is a convex figure and the injection mold is extracted in one direction, the injection mold can be inclined with respect to all surfaces. The face perpendicular to the direction of extraction of the injection mold will be distorted during extraction due to adhesion between the mold and the resin, but the distortion can be reduced if the injection mold has an inclination in the extraction direction. In this case, the molding can be done with a single set of molds, and the light guiding part 30 can be made as a single part, eliminating the need for portions or the like to join parts together. This makes it possible to provide a compact and highly accurate gas detection apparatus that is inexpensive and yields fewer defective products. From the perspective of good mold release, the angle between an elliptical symmetry plane present at the center of the major axis of the ellipsoid (elliptical mirror 30E) and a portion of the folded mirror 30C, which is a plane or quadric surface, connected to the light guiding part 30 is preferably 1° or more. The portion of the folded mirror 30C connected to the light guiding part 30 is the contact point between the folded mirror 30C and the inner surface of the light guiding part 30 excluding the folded mirror 30C in a cross-sectional view. In the example in FIG. 5, the portion of the folded mirror 30C that is connected to the light guiding part 30 is the contact point ("C" in FIG. 5) between the folded mirror 30C and the inner surface of the elliptical mirror 30E. The angle between the elliptical symmetry plane and the portion of the folded mirror 30C connected to the light guiding part 30 is the angle that a tangent line makes with the elliptical symmetry plane when the tangent line at the aforementioned contact point of the folded mirror 30C is extended virtually in a cross-sectional view. This angle is more preferably 2° or more.

This angle is even more preferably 5° or more. From the perspective of the optical principle described below, the folded mirror is required to be approximately parallel to the plane of symmetry. The angle is therefore preferably 30° or less. This angle is more preferably 20° or less. This angle is even more preferably 5° or less.

Holding Part

The holding part 40 is a member for holding the light receiving part 10, the light emitting part 20, and the light guiding part 30. Holding means trying to maintain the relative positional relationship of each member with respect to an external force. The holding form is not particularly limited, but mechanical holding is preferable. The holding form may be electromagnetic or chemical holding.

When the gas detection apparatus of the present embodiment has a controller, the controller may be held by the holding part 40.

The holding part 40 is not particularly limited as long as it can hold the light receiving part 20, the light emitting part 10, and the light guiding part 30. In the present embodiment, the holding part 40 is a resin package, but as other examples, it may be a printed circuit board or a ceramic package. A semiconductor substrate may be used as the holding part 40, and the light receiving part 20 and the light emitting part 10 may be formed on the same semiconductor substrate. When the holding part 40 is a resin package, it may have a lead frame inside, and the lead frame, the light emitting part 10, the light receiving part 20, and the controller may be electrically connected by a wire or the like. Further, when the holding part 40 is a printed circuit board, the printed circuit board, the light receiving part 20, and the light emitting part 10 may be electrically and mechanically connected by solder. Moreover, the holding part 40 and the light guiding part 30 are mechanically held by an adhesive, screws, claws, fittings, grommets, welding, or the like. Further, the holding part 40 may have a connection terminal for making an electrical connection with the outside. An identical holding part (for example, one printed circuit board) may hold the light emitting part 10 and the light receiving part 20. The identical holding part may further hold the controller.

Controller

The controller is a member that controls at least one of the light emitting part 10 and the light receiving part 20. The controller may have an analog-to-digital conversion circuit that converts an analog electric signal outputted from the light receiving part 20 into a digital electric signal. Moreover, the controller may have an operation part that executes a gas concentration calculation based on the converted digital electric signal.

The controller may have at least one of a general-purpose processor that executes a function corresponding to a read-in program and a dedicated processor for a specific process. The dedicated processor may include an Application Specific Integrated Circuit (ASIC). The processor may include a Programmable Logic Device (PLD).

Size of Gas Detection Apparatus

In general, in an optical system in which a light emitting part 10 and a light receiving part 20 are respectively arranged at the two focal points of an ellipsoidal mirror, light rays emitted from the light emitting part 10 can be collected at the light receiving part 20 if the ellipsoidal mirror is sufficiently large relative to the size of the light emitting part 10. Here, the shape of a part of the light guiding part 30 is composed of an ellipsoid E, the maximum length of the ellipsoid E is $L_E$, and the maximum length of the light source region is $L_s$. When the condition of $L_s \leq (L_E/50)$ is satisfied, the size of the light emitting part 10 is sufficiently small with respect to the ellipsoidal mirror and is approximately regarded as a point light source. Thus, the light rays emitted from one focal point position are collected at the other focal point position. In other words, when the size of the light emitting part 10 is not sufficiently small relative to the ellipsoidal mirror ($L_s \geq (L_E/50)$), light rays emitted from the light emitting part 10 are scattered throughout the ellipsoidal mirror and cannot be collected at the light receiving part 20.

The gas detection apparatus of the present embodiment exerts a particularly remarkable effect when $L_s \geq L_E/50$.

Similarly, when the maximum length of the light receiving region is $L_d$, the gas detection apparatus of the present embodiment exerts a particularly remarkable effect if the condition $L_d \geq (L_E/50)$ is satisfied.

Detailed Principle

In the following explanation, for the sake of clarity, it is assumed that the ellipsoid E is a spheroid (i.e., the ellipsoid E has focal points equivalent to the focal points $F_a$ and $F_b$).

Figure 3A:
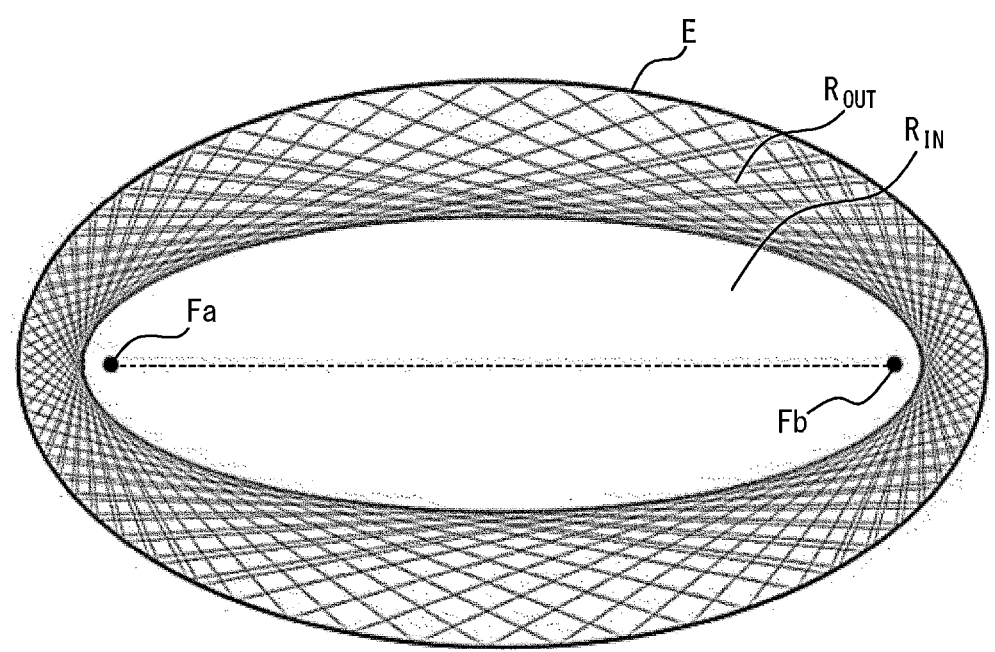
FIG. 3A is a diagram illustrating an example of a ray tracing simulation result.
Figure 3B:
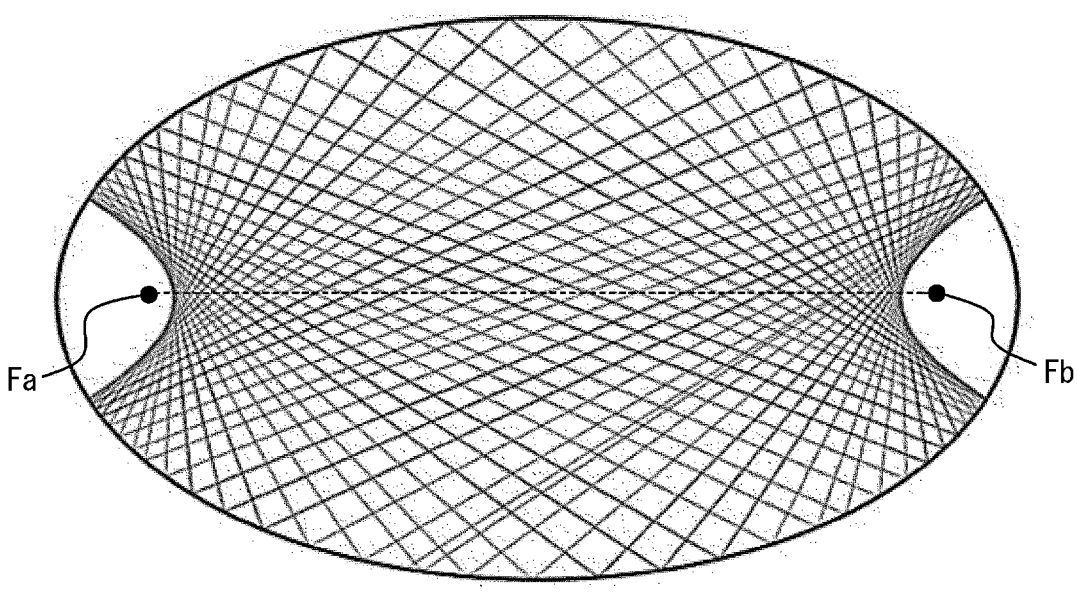
FIG. 3B is a diagram illustrating an example of a ray tracing simulation result.

As illustrated in PTL 1, in a case in which light rays are emitted from a point in the region $R_{out}$, which is a region outside the focal points $F_a$ and $F_b$ of the ellipsoid E, the light rays are repeatedly reflected on the mirror surface. However, the light rays do not pass through the line segment connecting the focal point $F_a$ and the focal point $F_b$ of the ellipsoid E (FIG. 3A). Also, in a case in which light rays are emitted from a point in the region $R_{in}$, the light rays are repeatedly reflected on the mirror surface and are repeatedly reflected while passing through the line segment connecting the focal point $F_a$ and the focal point $F_b$ of the ellipsoid (FIG. 3B). The technology of PTL 1 applies this optical phenomenon and includes the light emitting part 10 and the light receiving part 20 in the region $R_{out}$. Here, the optical phenomenon whereby light rays emitted from a point in the region $R_{out}$ are repeatedly reflected, without passing through the line segment connecting the focal point $F_a$ and the focal point $F_b$, and remain in the region $R_{out}$ is called "external reflection mode". The optical phenomenon whereby light rays emitted from a point in the region $R_{in}$ are repeatedly reflected, while passing through the line segment connecting the focal point $F_a$ and the focal point $F_b$, and remain in the region $R_{in}$ is called "internal reflection mode". The optical phenomenon whereby the external reflection mode and the internal reflection mode exist separately is referred to as the "reflection mode separation phenomenon".

Figure 4:
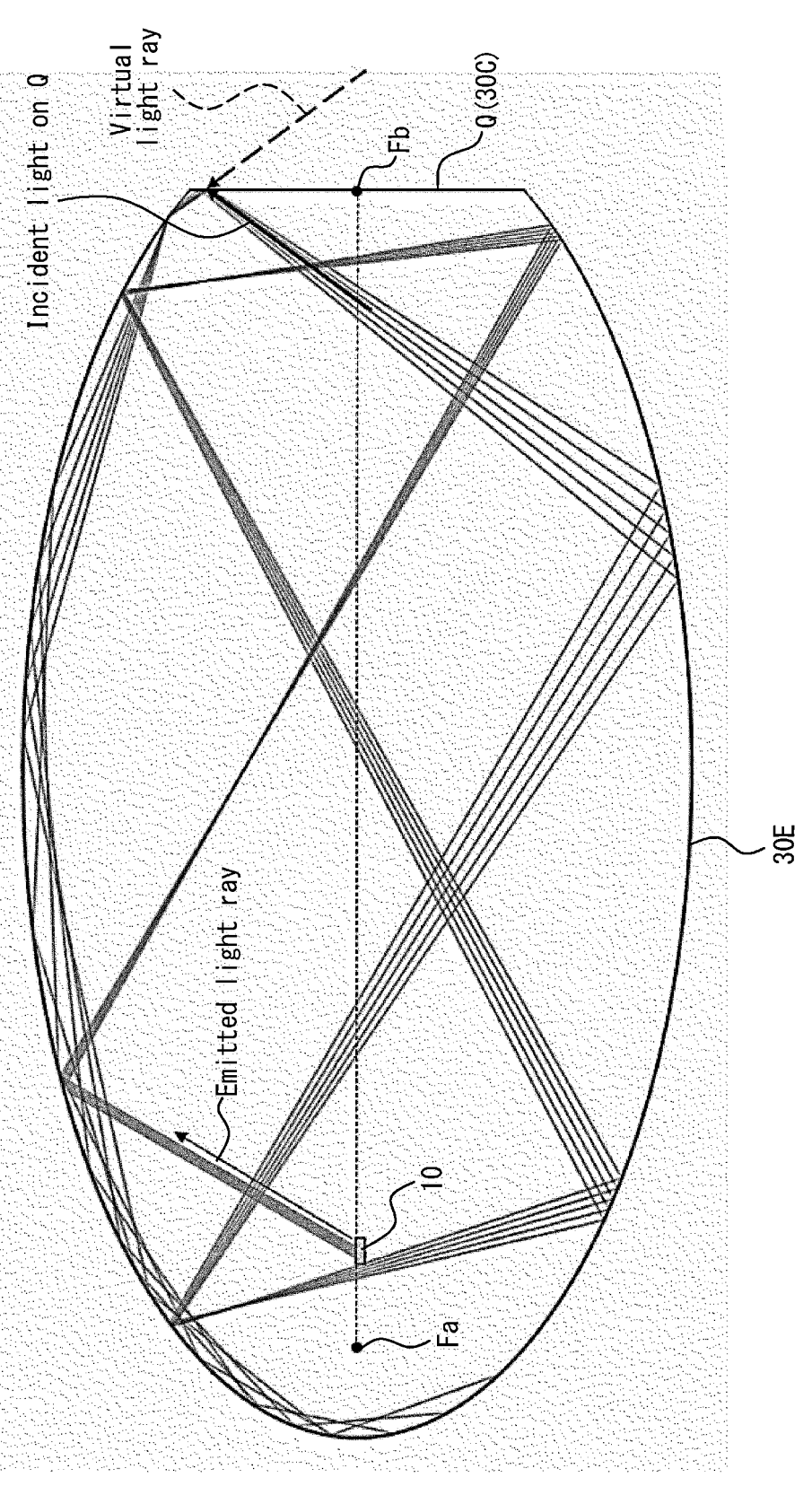
FIG. 4 is a diagram illustrating an example of a ray tracing simulation result in a gas detection apparatus according to an embodiment of the present disclosure.

Here, FIG. 4 illustrates a gas detection apparatus according to an embodiment of the present disclosure for a case in which the shape of the reflection surface Q of the folded mirror 30C is planar. In the example in FIG. 4, light rays emitted from the light emitting part 10 in the region $R_{in}$ first repeat the internal reflection mode, but after several reflections, the mode of the light rays transitions from the internal reflection mode to the external reflection mode by being reflected at the reflection surface Q. This transition is caused by how the light rays from the region $R_{in}$, which are in the internal reflection mode, are reflected by the mirror on the reflection surface Q and can be regarded as light rays emitted in a mirror-like manner from a point in the region $R_{out}$ of the ellipsoid E (light rays in the external reflection mode). This transition of the reflection mode of light rays is referred to as "reflection mode transition". Similarly, light rays in the external reflection mode become light rays in the internal reflection mode by being reflected at the reflection surface Q. In other words, reflection at the reflection surface Q triggers the transition between the "internal reflection mode" and the "external reflection mode".

The sensitivity of the gas detection apparatus can be improved by applying this reflective mode transition. When only light rays in the external reflection mode are used, the optical path length is approximately equal to the arc length of the ellipsoidal mirror. In the gas detection apparatus according to the present embodiment, the light emitting part 10 is arranged in the area $R_{in}$, the light receiving part 20 is arranged in the area $R_{out}$, and the gas detection apparatus is configured for reflection mode transition to occur. This enables use of both internal reflection mode and external reflection mode to achieve approximately twice or more the number of light ray reflections in the light guiding part 30 (to increase the optical distance). A compact and highly accurate gas detection apparatus with a longer optical path length per size and increased gas sensitivity per volume can be provided.

Even in a case in which the light source region of the light emitting part 10 is partially present in the region $R_{in}$ and the light receiving region of the light receiving part 20 is partially present in the region $R_{out}$, the effects of the present embodiment are achieved in that partial region. Therefore, it suffices to adopt a configuration such that 60% or more of the light source region is present in the region $R_{in}$ and 60% or more of the light receiving region is present in the region $R_{out}$. As another example in which the light source region and the light receiving region are switched, it suffices to adopt a configuration such that 60% or more of the light receiving region is present in the region $R_{in}$ and 60% or more of the light source region is present in the region $R_{out}$. From the viewpoint of improving gas sensitivity, 70% or more of the light source region is preferably present in the region $R_{in}$. 80% or more of the light source region is more preferably present in the region $R_{in}$. All of the light source region is even more preferably present in the region $R_{in}$. Similarly, from the viewpoint of improving gas sensitivity, 70% or more of the light receiving region is preferably present in the region $R_{out}$. 80% or more of the light receiving region is more preferably present in the region $R_{out}$. All of the light receiving region is even more preferably present in the region $R_{out}$. Here, in a case in which the light source region and the light receiving region are switched, from the viewpoint of improving gas sensitivity, 70% or more of the light emitting region is preferably present in the region $R_{out}$. 80% or more of the light emitting region is more preferably present in the region $R_{out}$. All of the light emitting region is even more preferably present in the region $R_{out}$. Similarly, from the viewpoint of improving gas sensitivity, 70% or more of the light receiving region is preferably present in the region $R_{in}$. 80% or more of the light receiving region is more preferably present in the region $R_{in}$. All of the light receiving region is even more preferably present in the region $R_{in}$.

Figure 5:
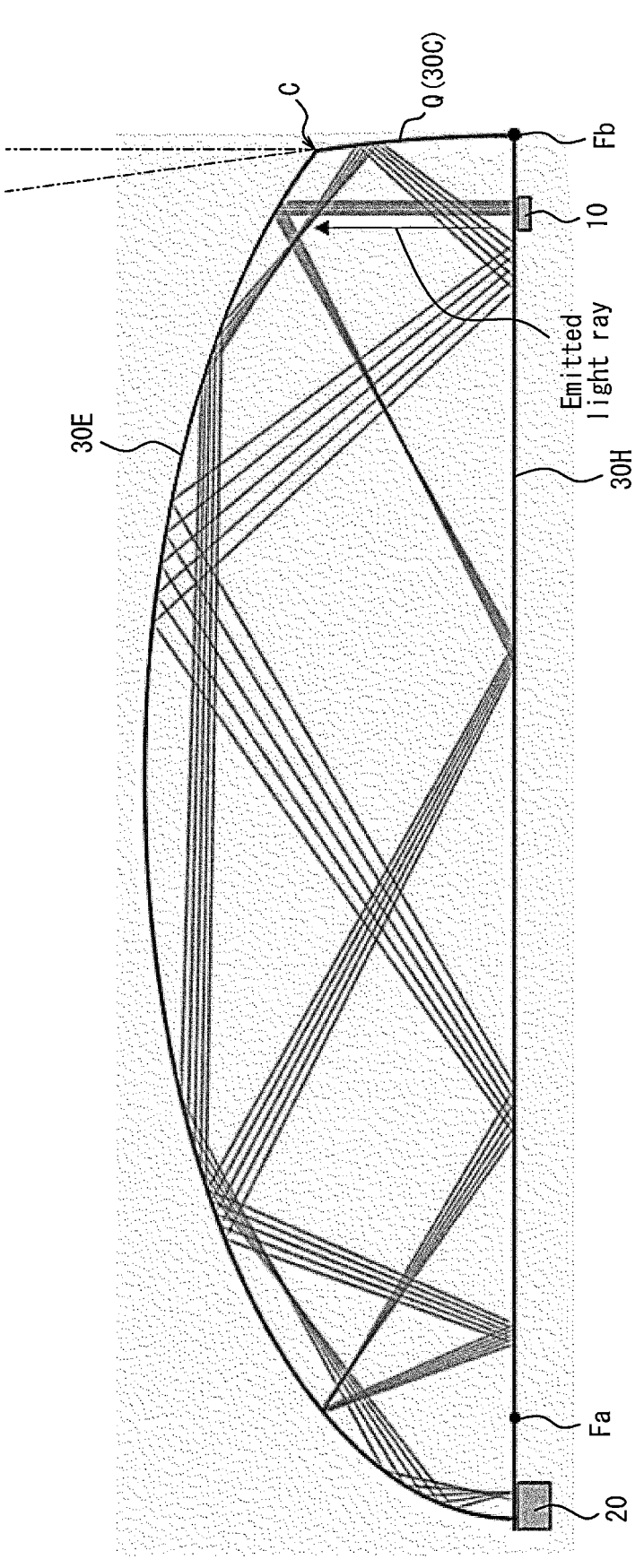
FIG. 5 is a diagram illustrating another example configuration of a gas detection apparatus according to an embodiment of the present disclosure.

Furthermore, the light receiving part may be located near the edge of the ellipsoid E. As illustrated in FIGS. 4 and 5, the external reflection mode of light rays tends to concentrate the light rays at the edge of the ellipsoid E (near the point where the ellipsoid E and the long axis of the ellipsoid E intersect). Therefore, the closer the light receiving region of the light receiving part 20 is to the edge of the ellipsoid E, the more efficiently the light rays can be focused, thus enabling provision of a compact and highly accurate gas detection apparatus. More specifically, letting the ellipse with the largest area in the cross-section of the ellipsoid E be the ellipse $E_c$, the shortest distance $L_{edg}$ between a focal point of the ellipse $E_c$ and the intersection between the ellipsoid E and the major axis of the ellipsoid E is given by $a-(a^2-b^2)^{1/2}$ for the major radius a and minor radius b of the ellipse $E_c$. 60% or more of the area of the light receiving region of the light receiving part 20 is preferably present at a distance of 40% or less of $L_{edg}$ from the intersection of the ellipsoid E and the major axis of the ellipsoid E, 80% or more of the area of the light receiving region of the light receiving part 20 is more preferably present at a distance of 40% or less of $L_{edg}$, and all of the area of the light receiving region of the light receiving part 20 is even more preferably present at a distance of 40% or less of $L_{edg}$. In addition, 60% or more of the area of the light receiving region of the light receiving part 20 is preferably present at a distance of 60% or less of $L_{edg}$, 80% or more of the area of the light receiving region of the light receiving part 20 is more preferably present at a distance of 60% or less of $L_{edg}$, and all of the area of the light receiving region of the light receiving part 20 is even more preferably present at a distance of 60% or less of $L_{edg}$. 60% or more of the area of the light receiving region of the light receiving part 20 is preferably present at a distance of 80% or less of $L_{edg}$, 80% or more of the area of the light receiving region of the light receiving part 20 is more preferably present at a distance of 80% or less of $L_{edg}$, and all of the area of the light receiving region of the light receiving part 20 is even more preferably present at a distance of 80% or less of $L_{edg}$.

Light rays emitted from the vicinity of the rotation axis if the ellipsoid E is a spheroid (or the twice-rotational symmetry axis if the ellipsoid E is a general ellipsoid) cannot be present at a position farther from the rotation axis due to conservation of angular momentum around the symmetry axis even after repeated reflection. Therefore, by having the light receiving region of the light receiving part 20 and the light source region of the light emitting part 10 be present near the rotation axis of the ellipsoid E, the light rays can be focused efficiently, thus enabling provision of a compact and highly accurate gas detection apparatus. To express this more concretely, 60% or more of the area of the light receiving region of the light receiving part 20 and the light source region of the light emitting part 10 is preferably present at a distance of 10% of the short radius of the ellipsoid E from the symmetry axis of the ellipsoid E. Here, the configuration for efficient focusing of light rays is not limited to a configuration with the light receiving part 20 and the light emitting part 10 present along the long axis. It suffices for the light receiving part 20 and the light emitting part 10 to overlap on the rotation axis in a front view, plan view, or the like.

That is, when 60% or more of the area of the light source region of the light emitting part 10 is present in the region $R_{in}$ and 60% or more of the area of the light receiving region of the light receiving part 20 is present in the region $R_{out}$, a compact and highly accurate gas detection apparatus that includes an ellipsoidal mirror and a folded mirror can be realized. This effect can be enhanced by a configuration such that the two focal points of the ellipsoid are sufficiently far apart and the region $R_{in}$ is formed, since in this case the optical path length of the light rays in the internal reflection mode is longer. For example, the ratio (a/b) of the long radius a to the short radius b of the aforementioned ellipse $E_c$ is preferably 1.2 or more.

Here, although it has been described that 60% or more of the light source region is present in the region $R_{in}$ and 60% or more of the light receiving region is present in the region $R_{out}$, focusing on the center of gravity or the peak point of luminance, the following holds. That is, assuming that the center of gravity of the light source region or the peak point of luminance is a point $G_{in}$ and the center of gravity of the light receiving region is a point $G_{out}$, the point $G_{in}$ is present in the region $R_{in}$ and the point $G_{out}$ is present in the region $R_{out}$. In the case of another example in which the light source region and the light receiving region are switched, it suffices for the center of gravity or peak point of luminance of the light source region to be the point $G_{out}$ and the center of gravity of the light receiving region to be the point $G_{in}$.

The reflection surface Q of the folded mirror 30C can, for example, be part of a general quadric surface including spheres and parabolas. To achieve the effects of the gas detection apparatus of the present embodiment, it is necessary to be able to consider a light ray reflected by the mirror of the reflection surface Q as being emitted from a point in the region $R_{out}$ of the ellipsoid E in a mirror-like manner. This condition is satisfied if the reflection surface Q is part of a general quadric surface.

The reflection surface Q may be arranged so as to pass through a focal point of the ellipsoid E, or so as to pass through the vicinity of a focal point. This is because even if the reflection surface Q does not pass strictly through a focal point, many light rays reflected by the reflection surface Q can be regarded as light rays emitted from a point in the region $R_{out}$ of the ellipsoid E in a mirror-like manner. Here, the vicinity is the region at a distance of $L_E/4$ or less from one focal point, where $L_E$ is the maximum length of the ellipsoid E. The vicinity is preferably a region at a distance of $(L_E/6)$ or less from one focal point, and even more preferably a region at a distance of $(L_E/8)$ or less from one focal point.

The ellipsoid E may be a spheroid with an axis of symmetry or it may be a general ellipsoid with different diameters. This is because even for a general ellipsoid that is not a spheroid, the orbits of the internal reflection mode and external reflection mode do not intersect, and the reflection mode separation phenomenon occurs.

Arrangement With Long Axis Symmetric Surface Mirror

Figure 7A:
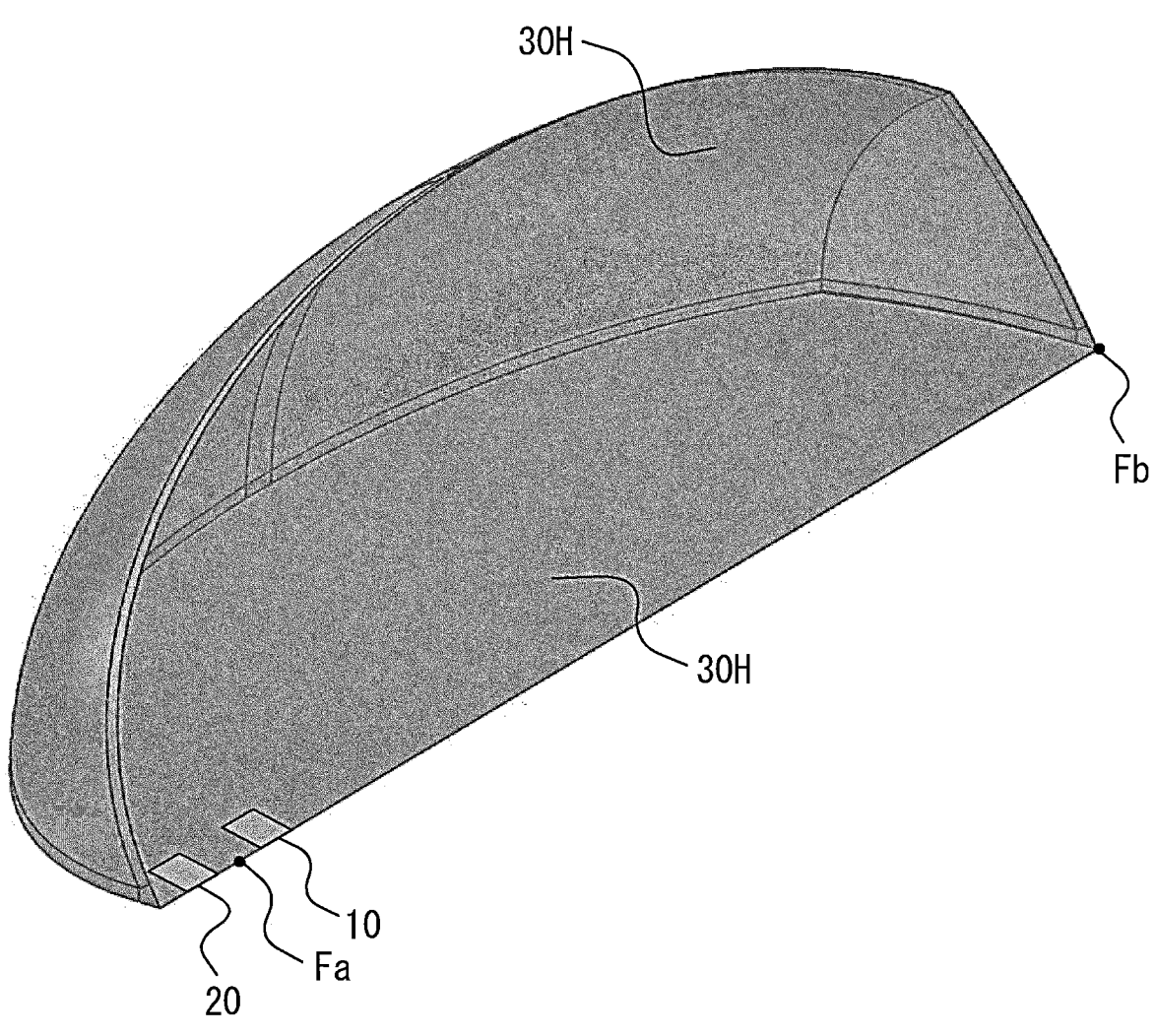
FIG. 7A is an overhead view illustrating an example configuration of a gas detection apparatus including a long axis symmetry plane mirror.
Figure 7B:
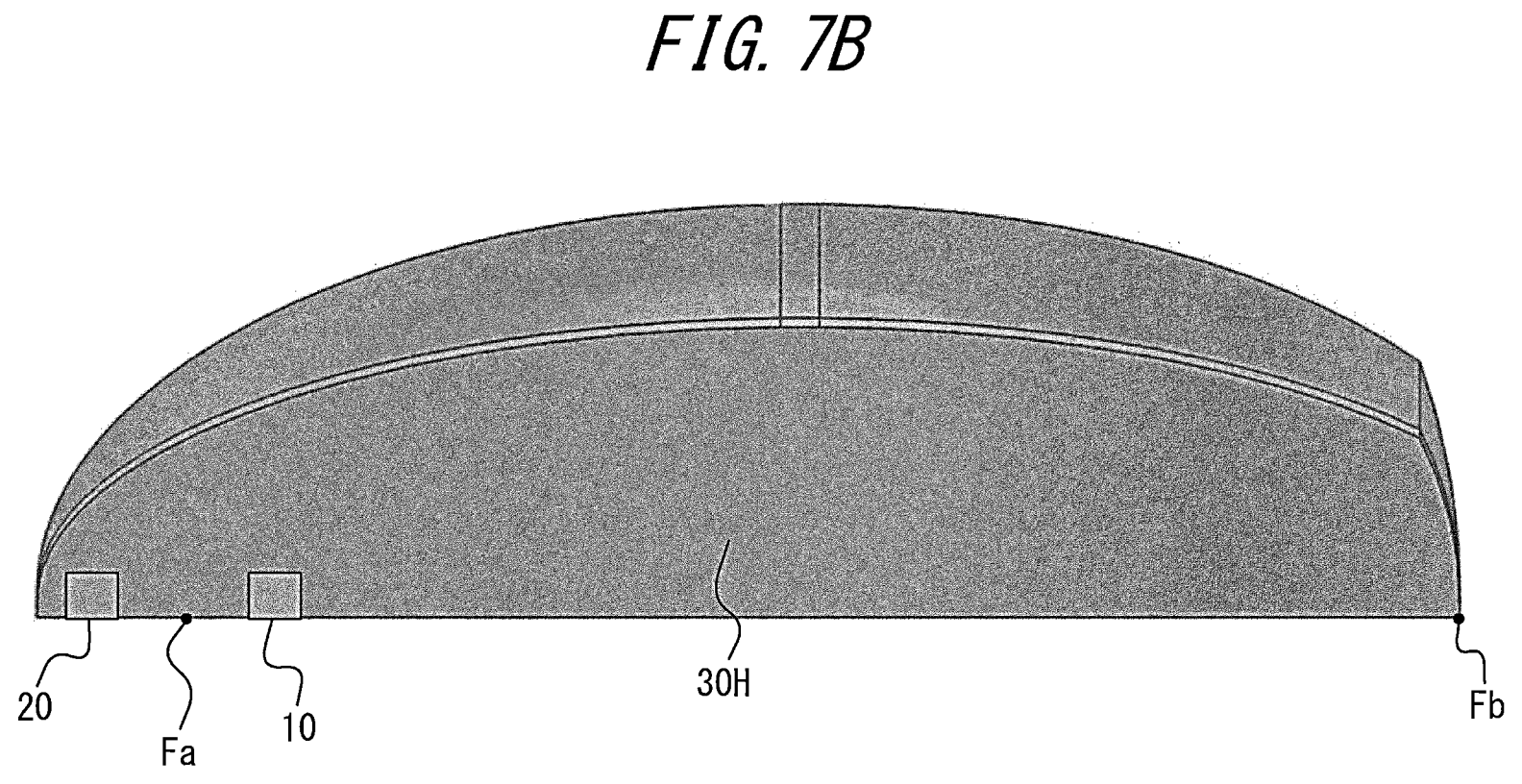
Figure 7C:
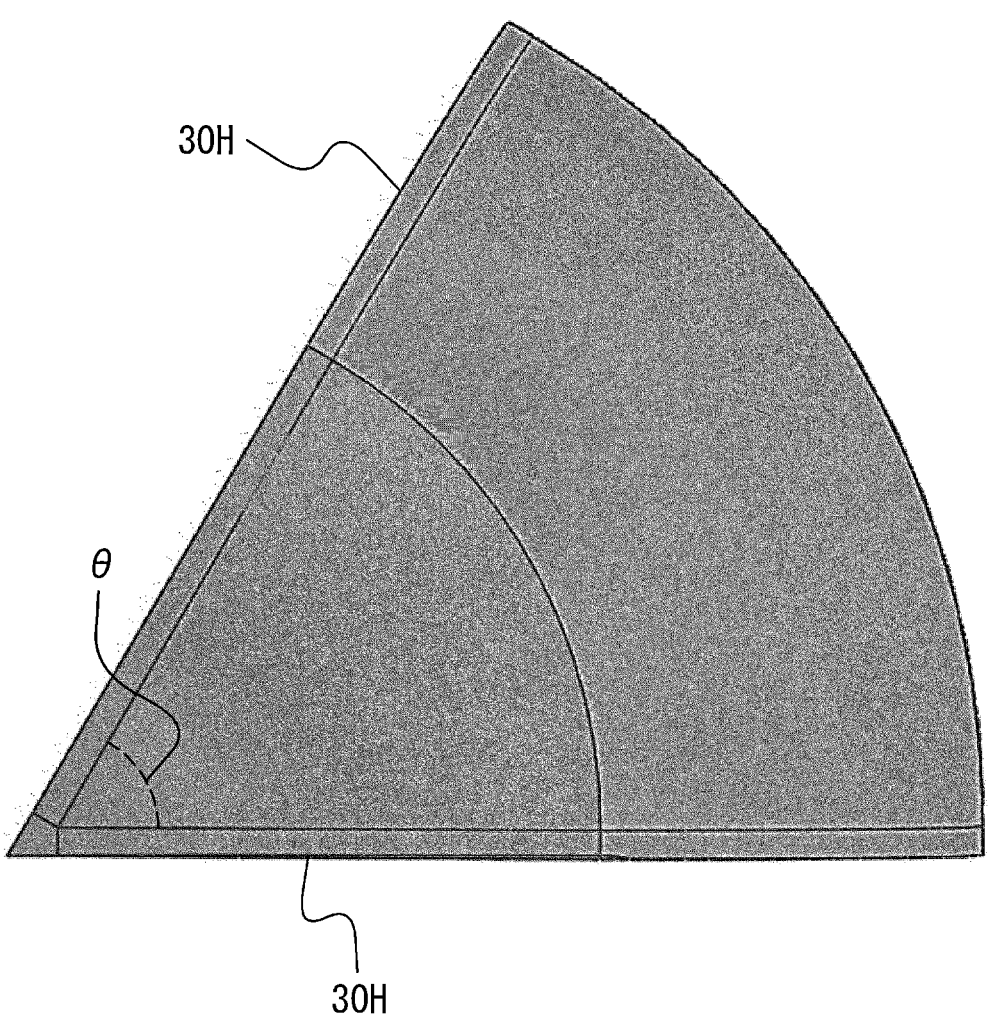
FIG. 7C is a side view illustrating an example configuration of a gas detection apparatus including a long axis symmetry plane mirror.

As described above, the gas detection apparatus may include the long axis symmetry plane mirror 30H. As illustrated in FIGS. 7A through 7C, the addition of a plane mirror to the symmetry plane of the ellipsoid E can be treated as only a mirror-like folding of the light rays reflected by the light guiding part 30, with no optical change in the mirror shape, because the same reflection mode separation phenomenon occurs. That is, two or more reflection surfaces of the long axis symmetry plane mirror 30H may be connected to the symmetry plane of the ellipsoid E, and the angle between any two of the reflection surfaces may be $10° \leq \theta \leq 180°$. By the optical path being folded, the same optical path length can be achieved with a more compact gas detection apparatus. In addition, the shape of the reflection surface may be composed of a figure of a part of a plane or quadric surface. Here, FIG. 7A is an overhead view, FIG. 7B is a front view, and FIG. 7C is a side view. The angle of the fan shape ($\theta$) illustrated in FIG. 7C may satisfy the relationship $10° \leq \theta \leq 180°$ or the relationship $10° \leq \theta \leq 90°$ but more preferably satisfies the relationship $\theta = 360°/(2n)$, where n is a natural number. In addition, the relationship $\theta = 360°/(2n+1)$ may be satisfied. For example, when $\theta$ is 120°, 90°, 60°, 45°, 30°, 20°, or the like, 360° is a multiple of θ, which achieves a longer optical path length per unit volume. However, the above equation does not have to be strictly satisfied for the angle of the fan shape (θ). The value of θ may, for example, have a deviation within ±10% of the value of 360°/(2n) or 360°/(2n+1). The deviation is more preferably within a range of ±5°, and even more preferably ±3°. The deviation is more preferably within a range of the smaller of ±10% and ±5°, and even more preferably within a range of the smaller of ±10% and ±3°. Similarly, there may be more than one plane mirror containing the major axis of symmetry of the ellipsoid E, since the virtual mirror shape of the ellipsoid E can be treated as unchanged.

Arrangement of Light Emitting Part

FIG. 5 illustrates another example configuration of the gas detection apparatus. Unlike the configurations of FIGS. 1 and 4, the light emitting part 10 is arranged in the vicinity of the folded mirror 30C. Even in the configuration of FIG. 5, a compact and highly accurate gas detection apparatus can be realized according to the aforementioned principle.

Although embodiments have been described based on the various drawings and examples, it should be noted that a person of ordinary skill in the art could easily make various modifications and revisions based on the present disclosure. Accordingly, such modifications and revisions should also be considered to be included within the scope of the present disclosure.

Figure 6:
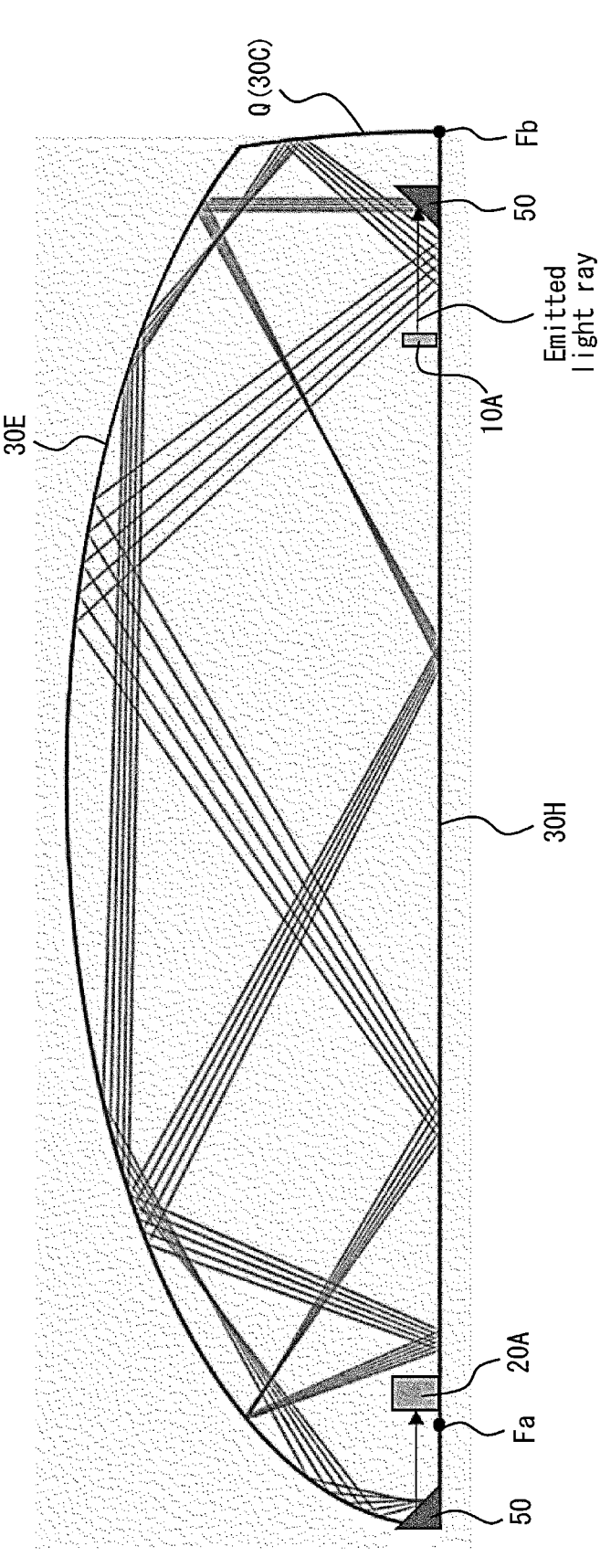
FIG. 6 is a diagram illustrating another example configuration of a gas detection apparatus according to an embodiment of the present disclosure.

FIG. 6 is a diagram illustrating another example configuration of a gas detection apparatus according to an embodiment of the present disclosure. In the example in FIG. 6, the gas detection apparatus includes the light emitting part 10, which includes a light emitting element (10A) and a passive element, and the light receiving part 20, which includes a light receiving element (20A) and an indirect element. The passive element and indirect element are 45° mirrors (50). As yet another example configuration, the passive element and indirect element may be mirrors such as concave mirrors, optical filters, phosphors, lenses, diffraction gratings, optical fibers, or optical waveguides.

The invention claimed is:

1. An optical density measuring apparatus comprising: a light emitting part; a light receiving part; and a light guiding part for guiding light from the light emitting part to the light receiving part, wherein a shape of at least a part of an inner surface of the light guiding part is composed of a figure of a part of an ellipsoid E, and a shape of at least a part of another portion of the inner surface of the light guiding part is composed of a figure of a part of a plane or a quadric surface, and when:

an ellipse having a maximum area in a cross-section of the ellipsoid E is defined as an ellipse $E_c$, and an ellipsoid that passes through two focal points $F_a$ and $F_b$ of the ellipse $E_c$ and has a minimum volume having a scaling relationship with the ellipsoid E without being rotated is defined as an ellipsoid $E_{in}$;

a region included in the ellipsoid $E_{in}$ is defined as a region $R_{in}$; and a region inside the ellipsoid E and not included in the ellipsoid $E_{in}$ is defined as a region $R_{out}$;

60% or more of an area of a light source region of the light emitting part is present in the region $R_{in}$, and 60% or more of an area of a light receiving region of the light receiving part is present in the region $R_{out}$.

2. The optical density measuring apparatus according to claim 1, wherein all of the area of the light source region of the light emitting part is present in the region $R_{in}$, and all of the area of the light receiving region of the light receiving part is present in the region $R_{out}$.

3. The optical density measuring apparatus according to claim 1, wherein the plane or the quadric surface passes through a vicinity of one focal point of the ellipse $E_c$.

4. The optical density measuring apparatus according to claim 3, wherein the vicinity is a region at a distance of $L_E/4$ or less from the one focal point when $L_E$ is a maximum length of the ellipsoid E.

5. The optical density measuring apparatus according to claim 1, wherein the light receiving part is located near an edge of the ellipsoid E.

6. The optical density measuring apparatus according to claim 1, wherein an angle between an elliptical symmetry plane present at a center of a major axis of the ellipsoid E and a portion where the light guiding part is connected to the plane or the quadric surface is 1° or more.

7. The optical density measuring apparatus according to claim 1, wherein a ratio a/b of a long radius a to a short radius b of the ellipse $E_c$ is 1.2 or more.

8. The optical density measuring apparatus according to claim 1, wherein $L_s \geq (L_E/50)$ when $L_s$ is a maximum length of the light source region and $L_E$ is a maximum length of the ellipsoid E.

9. The optical density measuring apparatus according to claim 1, wherein $L_d \geq (L_E/50)$ when $L_d$ is a maximum length of the light receiving region and $L_E$ is a maximum length of the ellipsoid E.

10. The optical density measuring apparatus according to claim 1, wherein an identical holding part holds the light emitting part and the light receiving part.

11. The optical density measuring apparatus according to claim 1, further comprising an auxiliary reflector composed of a figure different from the ellipsoid E.

12. The optical density measuring apparatus according to claim 11, wherein the auxiliary reflector is present in the region $R_{in}$.

13. The optical density measuring apparatus according to claim 1, wherein the light emitting part is a plane light source.

14. The optical density measuring apparatus according to claim 1, wherein the ellipsoid E is a spheroid.

15. The optical density measuring apparatus according to claim 1, wherein the shape of at least the part of another portion of the inner surface of the light guiding part is a plane.

16. The optical density measuring apparatus according to claim 1, wherein the shape of at least the part of another portion of the inner surface of the light guiding part is a sphere.

17. The optical density measuring apparatus according to claim 1, wherein two or more reflection surfaces composed of a figure of a part of a plane or a quadric surface are connected to a symmetry plane of the ellipsoid E.

18. The optical density measuring apparatus according to claim 17, wherein an angle formed by a part at which the two reflection surfaces are connected is 10° or more and is 90° or less.

19. An optical density measuring apparatus comprising: a light emitting part; a light receiving part; and a light guiding part for guiding light from the light emitting part to the light receiving part, wherein a shape of at least a part of an inner surface of the light guiding part is composed of a figure of a part of an ellipsoid E, and a shape of at least a part of another portion of the inner surface of the light guiding part is composed of a figure of a part of a plane or a quadric surface, and when:

an ellipse having a maximum area in a cross-section of the ellipsoid E is defined as an ellipse $E_c$, and an ellipsoid that passes through two focal points $F_a$ and $F_b$ of the ellipse $E_c$ and has a minimum volume having a scaling relationship with the ellipsoid E without being rotated is defined as an ellipsoid $E_{in}$;

a region included in the ellipsoid $E_{in}$ is defined as a region $R_{in}$; and a region inside the ellipsoid E and not included in the ellipsoid $E_{in}$ is defined as a region $R_{out}$;

the center of gravity of the light source region or a peak point of luminance is defined as a point $G_{in}$, the center of gravity of the light receiving region is defined as a point $G_{out}$, the point $G_{in}$ is present in the region $R_{in}$, and the point $G_{out}$ is present in the region $R_{out}$.

20. An optical density measuring apparatus comprising: a light emitting part; a light receiving part; and a light guiding part for guiding light from the light emitting part to the light receiving part, wherein a shape of at least a part of an inner surface of the light guiding part is composed of a figure of a part of an ellipsoid E, and a shape of at least a part of another portion of the inner surface of the light guiding part is composed of a figure of a part of a plane or a quadric surface, and when:

an ellipse having a maximum area in a cross-section of the ellipsoid E is defined as an ellipse $E_c$, and an ellipsoid that passes through two focal points $F_a$ and $F_b$ of the ellipse $E_c$ and has a minimum volume having a scaling relationship with the ellipsoid E without being rotated is defined as an ellipsoid $E_{in}$;

a region included in the ellipsoid $E_{in}$ is defined as a region $R_{in}$;

a region inside the ellipsoid E and not included in the ellipsoid $E_{in}$ is defined as a region $R_{out}$;

60% or more of an area of a light source region of the light emitting part is present in the region $R_{out}$, and 60% or more of an area of a light receiving region of the light receiving part is present in the region $R_{in}$.

\* \* \* \* \*